United States Patent [19]
Benson et al.

[11] Patent Number: 5,988,899
[45] Date of Patent: Nov. 23, 1999

[54] IN-RIP SORTING OF OBJECTS IN THE SLOW SCAN DIRECTION

[75] Inventors: Craig H. Benson, Fremont; Michael L. Parker, Los Gatos, both of Calif.

[73] Assignee: Adobe Systems Incorporated, San Jose, Calif.

[21] Appl. No.: 09/173,851

[22] Filed: Oct. 16, 1998

[51] Int. Cl.[6] .......................................... B41J 5/30
[52] U.S. Cl. ................... 400/61; 400/70; 400/76; 400/77
[58] Field of Search .................. 400/61, 70, 76, 400/77; 395/788, 112, 114, 115, 117; 375/116

[56] References Cited

U.S. PATENT DOCUMENTS

| | | | |
|---|---|---|---|
| 5,666,543 | 9/1997 | Gartland | 395/788 |
| 5,727,137 | 3/1998 | LeClair et al. | 375/116 |
| 5,816,714 | 10/1998 | Hori | 400/61 |

*Primary Examiner*—Stephen R. Funk
*Assistant Examiner*—Charles H. Nolan, Jr.
*Attorney, Agent, or Firm*—Fish & Richardson P.C.

[57] ABSTRACT

A method of processing page description data for printing on a printing device having a print engine for printing on an output media. The method includes receiving page description data comprising objects to be placed on the output media where each object has a position on the output media. An area to be printed on the output media is divided into a first and subsequent bands. The objects are interpreted one object at a time to produce display list data. When all objects that intersect the first band have been interpreted, display list data for the first band is rendered without regard to whether objects or portions of objects in subsequent bands have been interpreted.

22 Claims, 3 Drawing Sheets

IN-RIP SORTING OF OBJECTS IN THE SLOW SCAN DIRECTION

BACKGROUND OF THE INVENTION

The invention relates generally to methods and systems for printing computer-generated images and more particularly to a method and apparatus for accelerating the process of printing a sheet on a output display device.

A computer system can output data to a wide variety of output display devices. Output display devices such as laser printers, plotters, imagesetters, and other printing devices produce an image or "visual representation" on a sheet of paper, a printing plate or the like. A printing device can print dots on a piece of paper corresponding to the information of a bitmap or pixelmap (where a pixelmap is characterized as having a depth of two or more bits). A "raster" printing device creates a visual representation by printing an array of pixels arranged in rows and columns from the bitmap.

One type of printing device is a printing press. A printing press may be used to produce books, newspapers, pamphlets, posters and other single and multi-page printed matter. The printing press advantageously prints multiple pages of printed matter at the same time onto a single sheet. Other devices used for printing multiple pages at the same time include imagesetters and plate setters.

When printing multiple pages, the individual pages are arranged in one or more sheets. Each sheet includes a layout of pages that may be ordered or otherwise optimized to facilitate post-printing processes. For example, the layout of the sheet may be arranged such that individual pages are in sequence when folding occurs.

Printing devices that produce output in response to page description language input are widely used. A page description language (PDL) is a high level language for describing objects to be displayed by an output device. A printing device may receive page description data in the form of a PDL file. In order to produce a finished sheet, a printing device typically interprets all of the objects contained in the PDL file. Thereafter, the printing device renders objects within the data into bitmaps and prints the sheet. Depending on the printing device, printing of a band may begin as soon as the objects within that band are rendered or printing may not begin until all of the objects for the sheet have been rendered.

Imposition is a process of arranging the pages for a sheet to achieve a proper sequence or position of each page relative to other pages. Imposition is performed to facilitate post-printing processes including fold and cut operations and binding. Conventional imposition processes are executed on a computer workstation prior to the printing process. A conventional imposition process operates on one or more PDL files or image data files and layout information for a given sheet. The PDL files are representative of the various pages (or sub-pages) of content to be displayed on a given sheet. The layout information describes how the pages are to be arranged to achieve the desired output result. The output of an imposition process is generally of the form of a single PDL file that includes all the data required (including external references, if any) for a printing device to print the sheet.

SUMMARY OF THE INVENTION

In general, in one aspect, a method of processing page description data for printing on a printing device having a print engine for printing on an output media. The method includes receiving page description data comprising objects to be placed on the output media where each object has a position on the output media. An area to be printed on the output media is divided into a first and subsequent bands. The objects are interpreted one object at a time to produce display list data. When all objects that intersect the first band have been interpreted, display list data for the first band is rendered without regard to whether objects or portions of objects in subsequent bands have been interpreted.

Aspects of the invention include numerous features. The output media can be a sheet and objects can be pages and printers marks to be displayed on the sheet. The print engine has a slow scan direction for printing on the output media and the bands can be ordered in the slow scan direction. A slow scan ordering of the objects by their position in the slow scan direction can be computed, whereby objects that overlap the first band appear in the slow scan ordering before objects that do not overlap the first band and the step of interpreting the objects interprets objects in order in accordance with the slow scan ordering.

Computing the slow scan ordering includes receiving a job ticket including a list of objects to be printed on the output media and sorting the objects according to their position and the slow scan direction.

Computing the slow scan ordering can include processing a user defined signature describing the position of each object on the page, determining the size of object to be printed for each object received, mapping the object size into the signature to determine a list of objects to be printed for each page and sorting the objects according to their position and the slow scan direction.

The objects can be selected from the group of printer's marks, regions of text and images. The objects can be PDF files. The method can include translating all objects received into PDF files prior to rendering. The printing device can be selected from the group of an image setter, a digital press, a printing press and a plate setter.

The method may include printing a proof on a second printing device prior to printing on the output media or displaying a visual representation of the output media on a visual output device prior to printing on the output media.

In another aspect, the invention provides a printing device configured to receive a plurality of page description language descriptions of pages to be printed on a sheet. The printing device includes a print engine for printing rendered objects on the sheet, a job ticket processor for receiving a job ticket including layout information including a list of objects to be printed on the sheet, an interpreter connected to receive page description language input and operating to interpret objects one at a time resulting in display list data. The interpreter divides the sheet into a first and subsequent bands and determines when all the objects that intersect the first band have been interpreted. The printing device includes a rendering engine coupled to the interpreter and operating to receive the interpreted objects and render the first band when every object in the first band has been interpreted without regard for whether objects in subsequent bands have been interpreted.

Aspects of the invention include numerous features. The printing device can include a second interpreter for translating all page description language descriptions received into PDF files prior to rendering. A resource verifier operating to verify the availability of all resources called in each page description language description received can be included. A proof print routine operating to cause the printing of a proof on a second printing device prior to printing on the output media can be included. An on-screen display routine operating to cause the display of a visual representation of the output media on a visual output device prior to printing on the output media can be included.

In another aspect, the invention provides a method of imposing and rendering image data to be printed by a printing device on a sheet where the printing device includes a print engine having a slow scan direction. The method includes receiving one or more page description files defining one or more pages to be printed on the sheet and receiving layout information defining the layout of the pages on the sheet including a list of objects to be printed on the sheet. The list of objects has an initial ordering. Objects that overlap are determined. The objects in the list of objects is sorted in the slow scan direction resulting in an ordered list of objects including ordering objects that overlap based on the initial ordering. Objects are interpreted one at a time from the ordered list resulting in display list data. The sheet is divided into a plurality of bands. When every object in a band has been interpreted, display list data is rendered to create pixelmaps.

In another aspect, the invention provides a computer program, residing on a computer-readable medium, having instructions for causing a printing device to receive page description data comprising objects to be placed on the output media, divide an area to be printed on the output media into a first and subsequent bands, interpret the objects one object at a time to produce display list data, recognize when all objects that intersect the first band have been interpreted and begin to render display list data for the first band when every object or portion of object in the first band has been interpreted without regard to whether objects or portions of objects in subsequent bands have been interpreted.

Advantages of the invention may include one or more of the following. The printing of a sheet of output media may be accelerated by allowing the printing device to begin printing prior to the interpretation of all objects. Rendering of a band may begin as soon as the objects associated with the band are interpreted. Rendering of a page contained within a sheet may occur prior to the completion of interpretation of all objects associated with the sheet. Early rendering may be advantageously employed in personalization printing processes so that portions of a page may be printed early in the printing process. Other advantages and features will become apparent from the description and from the claims.

DETAILED DESCRIPTION

The present invention may be embodied in any output device that receives page description data and produces from the data visual output, for example on a sheet of paper. An output device may include a prepress routine for implementing layout functions, a raster image processor for producing pixelmaps (or bitmaps, depending on the depth of the resultant data) from received data and one or more engines for producing images on varied output media. The invention has particular applicability to printing presses, imagesetters, plate setters, digital presses and the like and will be described in terms of an implementation in such a device, which will be referred to simply as an image setter.

Figure 1:
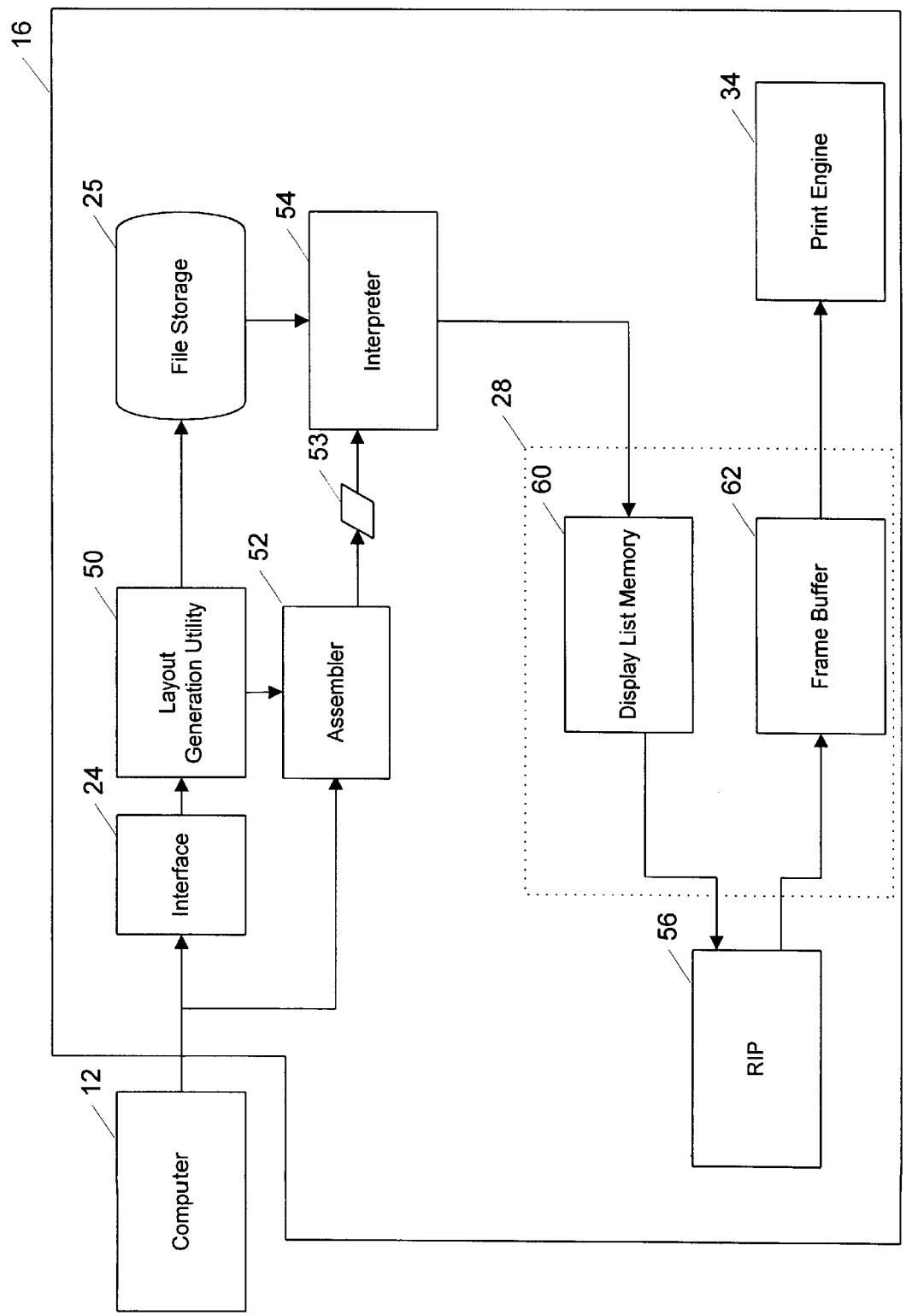
FIG. 1 is a block diagram of a printer in accordance with an implementation of the invention.

Referring to FIG. 1, an image setter 16 receives input data files, from a computer 12, for example, and turns the input data files into marks on a piece of film by sending signals to a print engine 34. The image setter 16 is configured to receive page description language input data files and layout information from one or more users and process it as is described below. Suitable page description languages include the Portable Document Format and the Postscript® languages available from Adobe Systems Incorporated of San Jose, Calif. the PCL language available from Hewlett-Packard Company of Palo Alto, Calif. and CT and LW available from Scitex America, Inc., of Bedford Mass. The PostScript® language is described in Adobe Systems Incorporated, Adobe PostScript® Language Reference Manual, Addison-Wesley (2d ed., ©1990).

A page description language file sent to an image setter specifies objects to be displayed and related information. A PostScript object can, for example, include a pixelmap defining a pattern of pixels to be displayed, or it can reference an outline curve defining in mathematical terms a shape to be marked. The object may also include other rasterizing information such as font, size and color.

Image setter 16 includes an interface 24, file storage 25, a digital data processor, random access memory 28, and print engine 34. It also includes read-only memory, I/O interfaces, and data transfer paths and buses, none of which are shown, for storing and transferring data in support of the functions described below.

Interface 24 regulates the flow of information between image setter 16 and computer 12 according to a standard communication protocol. Alternatively, interface 24 can support a file transfer protocol for sharing files between computers in networks on an intranet or internet. Interface 24 can include a buffer for buffering data received from computer 12 in the event image setter 16 is not ready to process or otherwise unable to manipulate the received data. The buffer can be part of file storage 25.

File storage 25 can be a mass storage device such as a hard disk or disk array for storing files received from computer 12. Each file typically includes one or more objects associated with a particular sheet to be outputted by the image setter. Image setter 16 can store all the files associated with a particular sheet in file storage 25 prior to rendering the data contained therein. Alternatively, image setter 16 can begin render operations prior to the receipt of all files required to print a sheet by processing the information contained within the job ticket to identify when a portion of the sheet (e.g., a band) is available for rendering. The render process is described in greater detail below.

The processor can be a general or special purpose microprocessor operating under control of computer program instructions executed from a memory. In the implementation illustrated in FIG. 1, the processor includes a number of special purpose sub-processors including a layout generation utility 50, a job ticket processor 52, interpreter 54 and a raster image processor (RIP) 56. Each sub-processor can be a separate circuit able to operate substantially in parallel with the other sub-processors. Some or all of the sub-processors can be implemented as computer program processes (software) tangibly stored in a memory to perform their respective functions. These may share an instruction processor, such as a general purpose integrated circuit microprocessor, or each sub-processor may have its own microprocessor for executing instructions. Alternatively, some or all of the sub-processors can be implemented in an ASIC (application specific integrated circuit). In addition, the sub-processors can be distributed or can form a part of computer 12.

Layout generation utility 50 processes input files received from computer 12 prior to storage in file storage 25. The processing may include layout functions, such as page sizing, resource checking, file translation, on-screen viewing, and job ticket generation.

Input files may be of varying formats and include page description language (PDL) files in the PostScript, PCL or Portable Document Format (PDF) format. Layout generation utility 50 determines the page size for each file received (in terms of physical length and width that the page is to occupy on a printed sheet). The page size information may be coupled with layout information (signature) received from a user to create a job ticket as will be described in greater detail below.

Layout generation utility 50 may include a resource checker for determining the resources required for printing a particular page. The resource checker enables early detection of error conditions, for example Postscript errors, thereby freeing system resources early in a printing process in the event of an error condition. Examples of resources include fonts, halftones, color rendering dictionaries, and open prepress interface (OPI) files. In addition, the resource checker may check all references embedded within a file to assure the objects that are referenced are available to image setter 16.

Layout generation utility 50 may include an on-screen preview function or proof print function. The on-screen preview function displays a visual representation of a sheet to be printed on a visual output display device such as a color display monitor coupled to image setter 16. The display of the sheet on a visual display prior to printing allows a user to adjust layout parameters as required prior to printing a final image on the media. The on-screen preview function may be invoked before or after rendering the original source page description files, resulting in either shadow boxes or actual rendered images to be displayed on the visual display device. The proof print function prints a visual representation on a desktop printer, plotter or other printing device coupled or otherwise linked to image setter 16 prior to a final print on image setter 16. Again, display of the sheet in printed form on a lower resolution output display device prior to final printing allows a user to adjust layout parameters as required prior to printing a final image on the media.

Layout generation utility 50 may also include a data translator for converting files from one format (an original equipment manufacturer (OEM) proprietary format, for example) to a second format (PDF, for example) which may be interpreted by interpreter 54. The data translator is invoked for all such files and the resultant files may be stored in file storage 25.

Layout generation utility 50 may receive order information and signature data from a user defining the ordering of files to be printed and a signature. Alternatively, the order information and signature data may be included in the individual files received that describe the respective objects to be printed on the media. A signature may include media information, transformation matrix information, clipping information, fold, cut and bind parameters and RIP parameters. Upon receipt of the order information, layout generation utility 50 may be invoked to map the file information (page size) into the signature to generate a list of sheets and surfaces to be processed. The list may be used to create a job ticket for transfer to job ticket processor 52. Alternatively, a job ticket may be generated by a routine executed on an external computer and may be provided directly to job ticket processor 52. Preps by ScenicSoft Corporation of Everett, Wash. is an example of a layout generation utility application which may be used to create a job ticket. Job tickets are discussed in greater detail below in association with FIGS. 2 and 3.

Job ticket processor 52 processes user requests received in the form of a job ticket and generates an ordered list of objects to be processed by interpreter 54 and RIP 56. A job ticket includes a list of objects, each object representative of a piece of content to be printed on a sheet. Each object is described by an associated bounding box and transformation matrix that indicates the object's location and size. In one implementation, the job ticket information is mapped to the imaging direction and orientation of the image setter. The imaging direction for the image setter includes a fast scan direction and a slow scan direction. The fast scan direction refers to the direction that the print head images across the media. The slow scan direction refers to the direction the media flows into the printing device. The orientation refers to the orientation of the printed materials, portrait or landscape, when applied to the media.

Each object's bounding box and transformation matrix is evaluated to determine which objects are to be rendered first based on slow scan direction. Objects having overlapping bounding boxes are listed according to their respective order in the job ticket. Job ticket processor 52 receives as an input a job ticket from either computer 12 or layout generation utility 50 and outputs an object list 53 to interpreter 54 for processing.

Interpreter 54 interprets objects from the object list in order. In one implementation, interpreter 54 interprets objects received and stores the interpreted object data in lists (display lists) sorted by band. The display lists may be resident in RAM 28 (for example, in display list memory 60) or on disk. The storage of objects in bands will be described in greater detail below in association with RAM 28. Alternatively, interpreter 54 may pass the interpreted object data directly to RIP 56 for immediate processing.

RIP 56 renders object data stored in display list memory (or object data received directly from interpreter 54) and produces bitmaps or pixelmaps for storage in frame buffer 62 in RAM 28. The processing of object data may begin prior to the completion of the interpretation process by interpreter 54 of all the objects in the ordered list. In one implementation, RIP 56 may be invoked to render a band of data once all the objects associated with a given band have been received and interpreted. After all of the objects associated with a given page (band) have been processed by RIP 56, the resultant pixel data may be applied to the media by print engine 34. Alternatively, the print process may be invoked upon the completion of the rendering of each complete band of data. The interpretation, rendering and printing processes are described in greater detail below.

RAM 28 may be used by one or more of the special purpose sub-processors 50–56. RAM 28 may include display list memory 60 and a frame buffer 62. Display list memory 60 may be used to store one or more lists. Each list stores objects or portions of objects representative of data to be displayed in a particular band of an output image.

Pixelmaps produced by RIP 56 may be compressed prior to storage in frame buffer 62. Accordingly, RAM 28 may also include an uncompressed band buffer memory (not shown) for storing uncompressed pixelmaps drawn by RIP 56 and frame buffer 62 may store compressed pixelmaps.

RAM 28 may be embodied in one or more memory chips. If display list memory 60 and the frame buffer 62 are consolidated into a single memory (a consolidated memory), then the memory may be partitioned or otherwise mapped to reflect the boundaries of the various memory sub-components. Alternatively, file storage 25 may be used in place of RAM 28 if a portion of the file storage is configured as virtual memory.

Data flow, rather than physical interconnection, is illustrated between elements of image setter 16. Processor and memory components are physically interconnected using a conventional bus architecture.

The image setter components that have been described can be packaged in a single product; alternatively, some can be included in computer 12 or otherwise housed separately.

Figure 2:
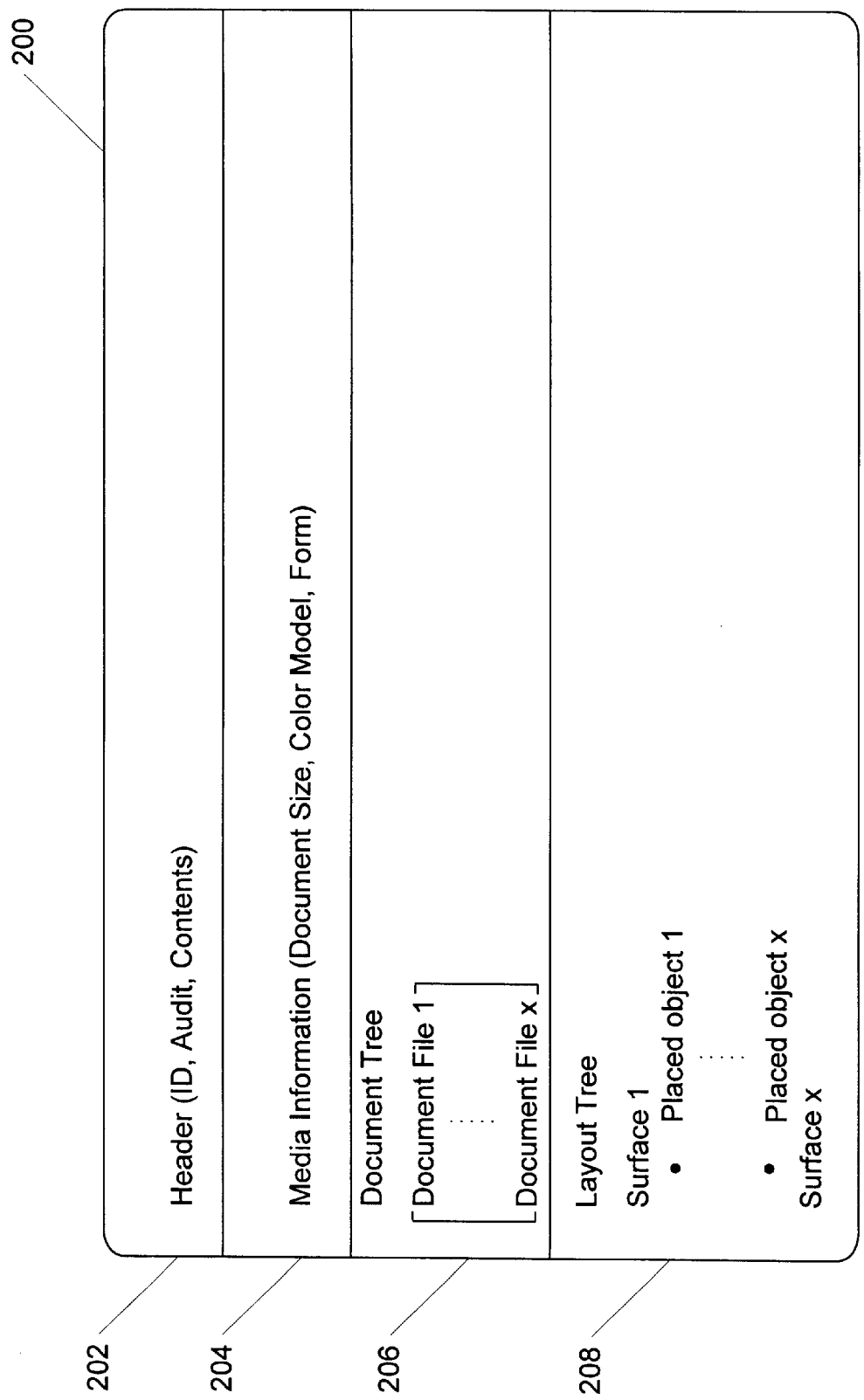
FIG. 2 is a functional block diagram of a job ticket in accordance with an implementation of the invention.

Referring now to FIG. 2, a job ticket 200 describes the layout of pages for one or more sheets associated with a job. The layout defines the specific placement of pages on a sheet. The layout may be influenced by media considerations (including the type of media and thickness of sheets) and user selected post-printing requirements such as folding, cutting, stacking and binding operations. Job ticket 200 may be generated by computer 12 and includes a header 202, media information 204, a document tree 206 and a layout tree 208.

Header 202 identifies a particular job ticket. Media information 204 includes information for identifying a media type including the dimensions of the target media. Document tree 206 includes a list of files and respective pages in the files which are to be placed in the final printed sheet. Layout tree 208 includes a list of layout objects which define exactly where and how a particular document object (page or file) in document tree 206 is to be placed on the media and includes a bounding box and transformation matrix for each object.

As was described above, a job ticket may be provided from computer 12, or generated by a layout generation utility resident in or external to image setter 16. In one implementation, job ticket 200 is coded such that the various sub-components of the job ticket are described by one or more objects.

Figure 3:
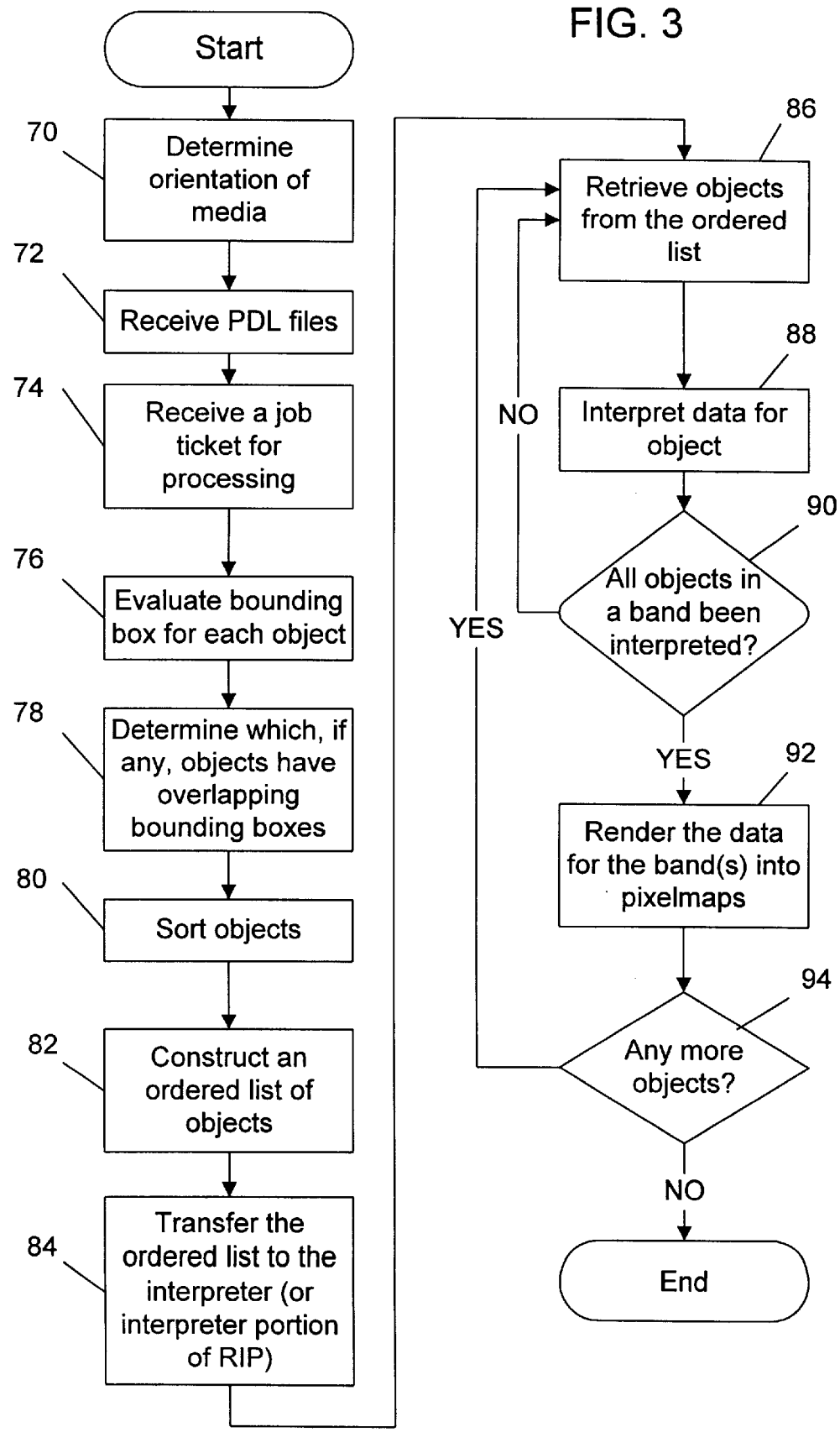
FIG. 3 is a flow chart for an accelerated printing process in accordance with an implementation of the invention.

Referring now to FIGS. 1 and 3, a routine for imposing and rendering image data is described in detail. Initially, system 10 determines the orientation of the media relative to the slow scan direction (step 70), receives one or more files (step 72) and a job ticket (step 74). The job ticket includes a list of objects to be printed on the output media and includes bounding box and transformation matrix information for each object. Job ticket processor 52 evaluates the bounding box and transformation matrix for every object contained in the job ticket (step 76) and determines whether any objects have overlapping bounding boxes (step 78).

Job ticket processor 52 sorts the list of objects based on slow scan direction (step 80). For all objects that have bounding boxes that do not overlap, the objects are sorted based on the slow scan direction. Objects with overlapping boundary boxes may be ordered based on the object priority contained within the job ticket. The Job ticket processor produces as an output an ordered list of objects(step 82).

The ordered list is transferred to interpreter 54 for processing (step 84). Interpreter 54 retrieves each object one at a time from the ordered list (step 86) and processes the associated PDL file (step 88). Interpreter 54 determines when all of the objects for a band have been interpreted (step 90). If not, the process continues at step 86. Once all the data for a band is interpreted, the interpreted object data may be rendered by RIP 56 into pixelmaps (step 92) which may be subsequently transferred to print engine 34 for printing. The process is repeated for each object to be printed (step 94).

The interpretation, rendering and printing processes may be conducted in parallel, where each sub-processor is configured to process data as available. Once all the bands associated with a particular sheet have been interpreted, rendered and printed, the process is complete. If, however, all the bands have not been interpreted, the next object is retrieved for interpretation and the process continues (step 88).

In one implementation, one or more objects may be layered and each layered object may include associated layer order information. Layer order information may be used to define the interpretation order for objects that overlap. The layer order information may be retrieved along with the file (step 72) and the job ticket (step 74). Layer information may be used in conjunction with the scan direction sequencing of objects in the job ticket to determine the ordered list for processing by interpreter 54. When objects are sorted, job ticket processor 52 sorts objects in the slow scan direction as before. Overlapping objects are sorted based on either the layer order or sequencing in the job ticket list, whichever is appropriate.

The present invention has been described in terms of specific implementations, which are illustrative of the invention and not to be construed as limiting. The invention may be implemented in hardware, firmware or software, or in a combination of them. Other implementations are within the scope of the following claims.

What is claimed is:

1. A method of processing page description data for printing on a printing device having a print engine for printing on an output media sheet, comprising:

receiving page description data comprising objects to be placed on the output media sheet, each object having a position on the output media sheet;

dividing an area to be printed on the output media sheet into a first and subsequent bands;

interpreting the objects one object at a time to produce display list data;

recognizing when all objects that intersect the first band have been interpreted; and beginning to render display list data forthe first band when every object or portion of object in the first band has been interpreted without regard to whether objects or portions of objects in subsequent bands including those to be printed on the same output media sheet have been interpreted.

2. The method of claim 1 where the output media is a sheet and objects are pages and printers marks to be displayed on the sheet.

3. The method of claim 1 where the print engine has a slow scan direction for printing on the output media and where the method further includes:

ordering the bands in the slow scan direction; and computing a slow scan ordering of the objects by their position in the slow scan direction, whereby objects that overlap the first band appear in the slow scan ordering before objects that do not overlap the first band, where the step of interpreting the objects interprets objects in order in accordance with the slow scan ordering.

4. The method of claim 3 wherein the step of computing the slow scan ordering includes:
   receiving a job ticket including a list of objects to be printed on the output media; and
   sorting the objects according to their position and the slow scan direction.

5. The method of claim 3 wherein the step of computing the slow scan ordering includes:
   processing a user defined signature describing the position of each object on the page;
   determining the size of object to be printed for each object received;
   mapping the object size into the signature to determine a list of objects to be printed for each page; and
   sorting the objects according to their position and the slow scan direction.

6. The method of claim 1, wherein the objects are selected from the group of printer's marks, regions of text and images.

7. The method of claim 1 wherein the objects are PDF files.

8. The method of claim 1 further comprising translating all objects received into PDF files prior to rendering.

9. The method of claim 1 wherein the printing device is selected from the group of an image setter, a digital press, a printing press and a plate setter.

10. The method of claim 1 further comprising printing a proof on a second printing device prior to printing on the output media.

11. The method of claim 1 further comprising displaying a visual representation of the output media on a visual output device prior to printing on the output media.

12. A printing device configured to receive a plurality of page description language descriptions of pages to be printed on a sheet, comprising:
   a print engine for printing rendered objects on the sheet;
   a job ticket processor for receiving a job ticket including layout information including a list of objects to be printed on the sheet;
   an interpreter connected to receive page description language input and operating to interpret objects one at a time resulting in display list data, to divide the sheet into a first and subsequent bands and to determine when all the objects that intersect the first band have been interpreted; and
   a rendering engine coupled to the interpreter and operating to receive the interpreted objects and render the first band when every object in the first band has been interpreted without regard for whether objects in subsequent bands including those to be printed on the same sheet have been interpreted.

13. The printing device of claim 12, wherein the objects are selected from the group of printer's marks, regions of text and images.

14. The printing device of claim 12 wherein the page description language descriptions are PDF files.

15. The printing device of claim 12 further including a second interpreter for translating all page description language descriptions received into PDF files prior to rendering.

16. The printing device of claim 12 wherein the printing device is selected from the group of an image setter, a digital press, a printing press and a plate setter.

17. The printing device of claim 12 further comprising a resource verifier operating to verify the availability of all resources called in each page description language description received.

18. The printing device of claim 12 further comprising a proof print routine operating to cause the printing of a proof on a second printing device prior to printing on the output media.

19. The printing device of claim 12 further comprising an on-screen display routine operating to cause the display of a visual representation of the output media on a visual output device prior to printing on the output media.

20. The printing device of claim 12 where the print engine has a slow scan direction for printing on the output media and where the rendering engine orders the bands in the slow scan direction, the job ticket processor computes a slow scan ordering of the objects by their position in the slow scan direction, whereby objects that overlap the first band appear in the slow scan ordering before objects that do not overlap the first band, and the interpreter interprets objects in order in accordance with the slow scan ordering.

21. The method of claim 1 wherein the interpreting step and rendering step are performed in parallel.

22. A method of processing page description data for printing on a printing device having a print engine for printing on an output media sheet, comprising:
   receiving page description data comprising objects to be placed on the output media sheet, each object having a position on the output media sheet;
   dividing an area to be printed on the output media sheet into a first and subsequent bands;
   recognizing when all objects that intersect the first band have been processed; and
   beginning to render data for the first band when every object or portion of object in the first band has been processed without regard to whether objects or portions of objects in subsequent bands including those to be printed on the same output media sheet have been processed.

* * * * *